United States Patent

Landers et al.

[11] Patent Number: 5,176,766
[45] Date of Patent: Jan. 5, 1993

[54] PNEUMATIC TIRE HAVING A UNIQUE FOOTPRINT

[75] Inventors: Samuel P. Landers, Uniontown; William E. Glover, Akron; John S. Attinello, Hartville, all of Ohio

[73] Assignee: The Goodyear Tire & Rubber Company, Akron, Ohio

[21] Appl. No.: 666,329

[22] Filed: Mar. 8, 1991

[51] Int. Cl.⁵ .............................................. B60C 11/11
[52] U.S. Cl. ............................... 152/209 R; D12/147
[58] Field of Search ........... 152/209 R, 209 B, 209 A, 152/209 D; D12/146-149, 151

[56] References Cited

U.S. PATENT DOCUMENTS

| | | | |
|---|---|---|---|
| D. 92,050 | 4/1934 | Vidale | D12/148 |
| D. 283,499 | 4/1986 | Hammond . | |
| D. 283,500 | 4/1986 | Graas et al. . | |
| 3,939,890 | 2/1976 | Abe | 152/209 B |
| 4,057,089 | 11/1977 | Johannsen . | |
| 4,700,762 | 10/1987 | Landers | 152/209 R |
| 4,962,801 | 10/1990 | Tsuda | 152/209 R |

OTHER PUBLICATIONS

"Marks Standard Handbook for Mechanical Engineers" Ninth Edition; pp. 2-8.
"Plane and Solid Geometry" Wentworth, pp. 47-48.
"Pneumatic Tyre Design"; E. C. Woods; 1955; p. 24.

Primary Examiner—Geoffrey L. Knable
Assistant Examiner—Nancy T. Krawczyk
Attorney, Agent, or Firm—David E. Wheeler

[57] ABSTRACT

A directional pneumatic tire having improved wet traction is provided. The tire has an annular aqua channel and curved lateral grooves to direct water from the footprint to the shoulder area of the tire to help prevent hydroplaning. It has been found that the tire has a unique footprint which appears to characterize its stability. The footprint comprises two substantially trapezoidal contact patches which are oriented base to base and are separated from each other by 10% to 22% of the total tread width.

6 Claims, 5 Drawing Sheets

PNEUMATIC TIRE HAVING A UNIQUE FOOTPRINT

BACKGROUND OF THE INVENTION

The invention relates to pneumatic tires which have improved wet traction and handling characteristics as well as improved noise and irregular wear characteristics.

This application is related to copending applications U.S. Ser. No. 07/666,816; 07/666,811; D667,100; 07/666,327; 07/666,328; and 07/666,815, incorporated herein by reference, and filed on even date herewith.

Hydroplaning of tires on wet pavement has long been a problem in the prior art. Various tire designs, adapted to channel water away from the tire, and thereby maintain rubber contact with the road have been tried by the prior art to correct this problem. Although prior art rain tire designs have improved wet traction, it is a continuing goal in the art to further improve wet traction.

Irregular wear has become a problem in tires in recent years due mainly to the expanding use of front wheel drive and the use of new suspension systems and braking systems. Design changes directed toward the irregular wear problem and the wet traction problem have sometimes caused handling problems and tire noise problems.

It is an object of the present invention to provide a pneumatic tire having improved wet traction while having good handling, improved noise and improved irregular wear characteristics.

Other objects of the invention will be apparent from the following description and claims.

DEFINITIONS

"Aspect Ratio" of the tire means the ratio of its section height to its section width.

"Aqua Channel" refers to an extra wide circumferential groove with angled (non-parallel), rounded groove walls designed specifically to channel water out of the footprint of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Design rim" means a rim having a specified configuration and width.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Sipes" refer to small slots molded into ribs of tire that subdivides the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Logarithmic spiral" refers to a spiral that has a gradually expanding arc, as opposed to a substantially constant arc as in for example an Archemedic spiral (i.e. as seen in a phonograph record).

"Lugs" refer to discontinuous radial rows of tread rubber in direct contact with the road surface.

"Net-to-gross" refers to the ratio of the ground contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load "Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Shoulder" refers to the upper portion of sidewall just below the tread edge.

"Sidewall" means that portion of a tire between the tread and the bead.

"Tie-Bar" refers to an extra thickness of rubber at the bottom of a slot such that, in the locations where the extra rubber is present, the slot depth is less than the slot depth at all other location. Tie-bars stabilize a lug by limiting the independent movement of two portions of a lug that are separated by slots, while traction properties that are inherent in the use of slots are provided.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

SUMMARY OF THE INVENTION

A pneumatic tire having as aspect ratio of 0.35 to 0.8 and having a footprint comprising two distinct contact patches, where each said contact patch has a substantially trapezoidal shape wherein the contact patches are oriented base to base is provided. The net-to-gross in the overall footprint is 50% to 70% and the net-to-gross in each contact patch is 60% to 80%. The contact patches are separated by 10% to 20% of the total footprint width.

In a preferred embodiment, the tire has a conventional construction comprising a pair of annular beads, carcass plies wrapped around said annular beads, a tread disposed over the carcass plies in a crown portion of the tire, and sidewalls disposed between the tread and the beads. The tread is preferably directional and has at least one annular aqua channel having a depth of 78% to 100% of the total tread depth and lateral grooves that comprise at least a portion of an S-shape.

In one embodiment circumferential grooves in the tread are discontinuous, the lugs of the tread being connected to each other laterally by bridges.

DETAILED DESCRIPTION OF THE INVENTION

Figure 1:
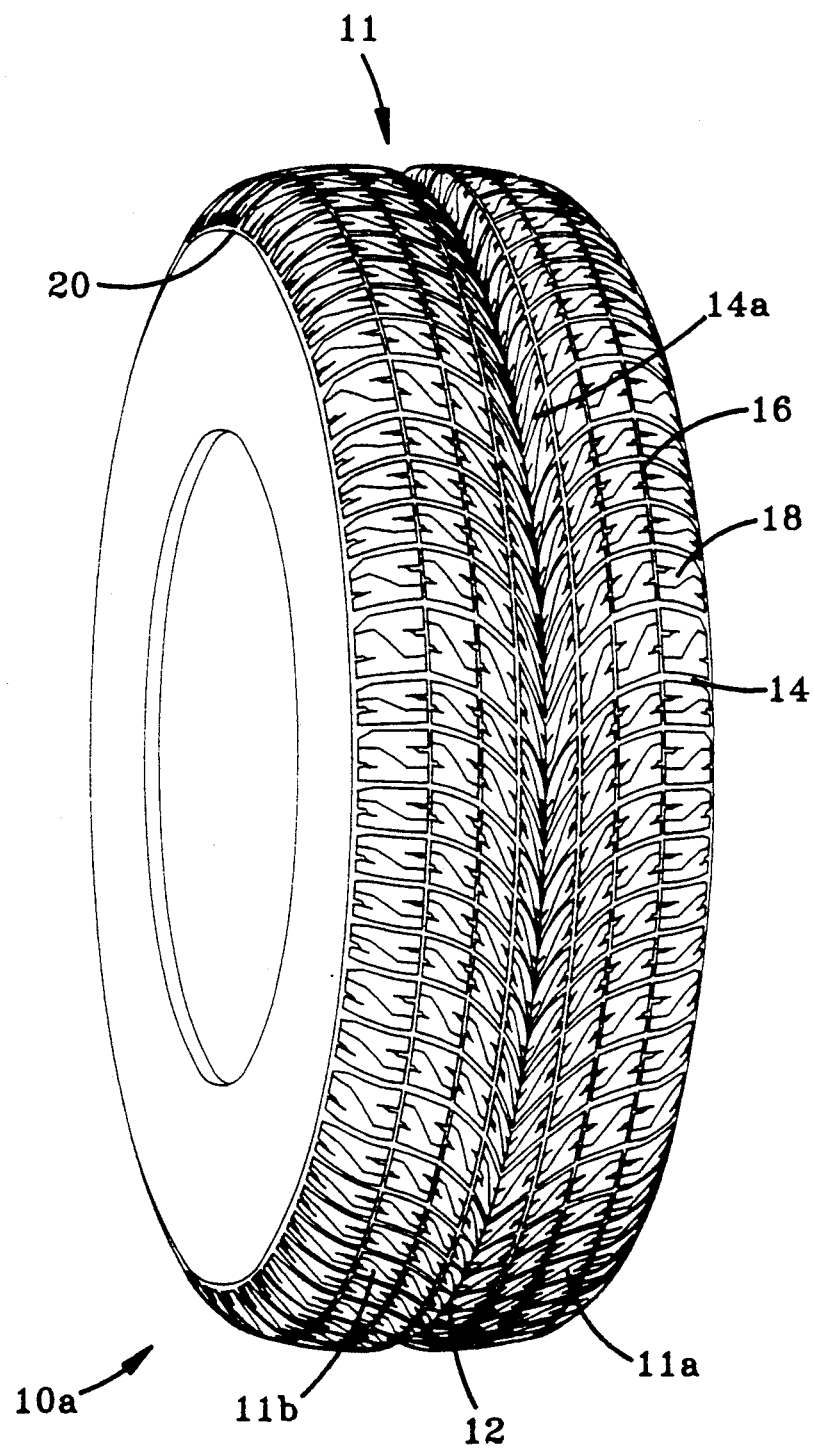
FIG. 1 is a perspective view of one embodiment of a tire of the invention.

With reference now to FIG. 1, tire 10a has a tread portion 11 which is divided into two parts, 11a, 11b by aqua channel 12. Curved lateral grooves 14 initiate in aqua channel 12 and take an uninterrupted arcuate path to shoulder 20. Circumferential grooves 16 intersect lateral grooves 14 forming lugs 18.

When driving on wet roads, the presence of the lateral grooves in the aqua channel substantially facilitates the flow of water from the aqua channel into the lateral grooves and out of the footprint of the tire through the shoulder. The curvature of the lateral grooves is such that the center or initial portion 14a of a lateral groove is in the leading edge of the footprint initiating the flow of water before the rest of the lateral groove enters the footprint. As the main portion of the lateral groove 14 enters the footprint, water in lateral groove 14 is expelled through the shoulder area with great force. Accordingly, the tread of the tire of the invention is directional since, if the tire is mounted such that the center portion 14a of the lateral groove enters the footprint last, water would be channeled toward, instead of away from the aqua-channel 12.

In a tire footprint under design load and pressure, the width of the aqua channel is 10%-22%, preferably about 15%, and the overall footprint net to gross is about 50% to 70%, preferably about 55 to 65%. In the illustrated embodiment the footprint net to gross is about 60%. In the contact patch, the part of the tire that touches the road (the footprint excluding the aqua channel), the net-to-gross is about 60%-80% preferably 65% to 75%. In the illustrated embodiment the contact patch net-to-gross is about 70%.

The depth of the aqua channel may comprise 78% to 100%, preferably 82% to 92% of the total tread depth (about 0.91 cm (0.36 in.) By total tread depth it is meant the distance from the tread base to the land area of a lug. In the illustrated embodiment the aqua channel depth is about 83% of the total tread depth or about 0.13 cm (0.05 in) less than the total depth. This depth has been chosen since it insures that the aqua channel will be present throughout the tread life of the tire since the tread wear indicators have a thickness of 0.16 cm (0.06 in).

Figure 2:
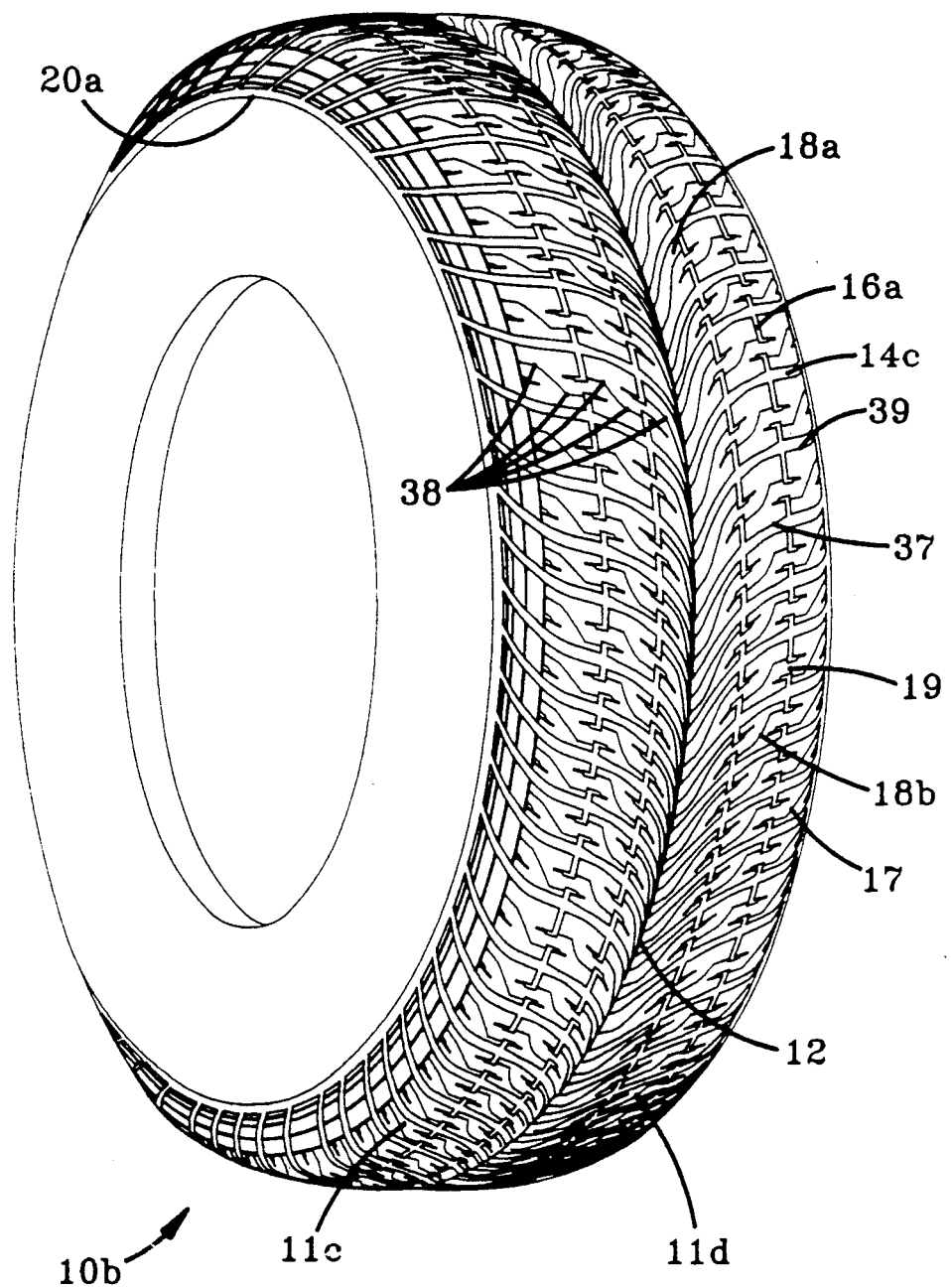
FIG. 2 is a perspective view of a second embodiment of a tire of the invention.

With reference now to FIG. 2 in an alternative embodiment of the tire 10b of the invention, aqua channel 12 divides tread area 11 into two parts 11c, 11d which each have an S-shaped lateral groove 14c. For convenience in defining the various embodiments, as used herein, S-shaped includes the shape of an S and its mirror image. Also, curved lateral groove 14 (FIG. 1) can be said to be a portion of an S-shape (about ½ of an S).

Figure 3:
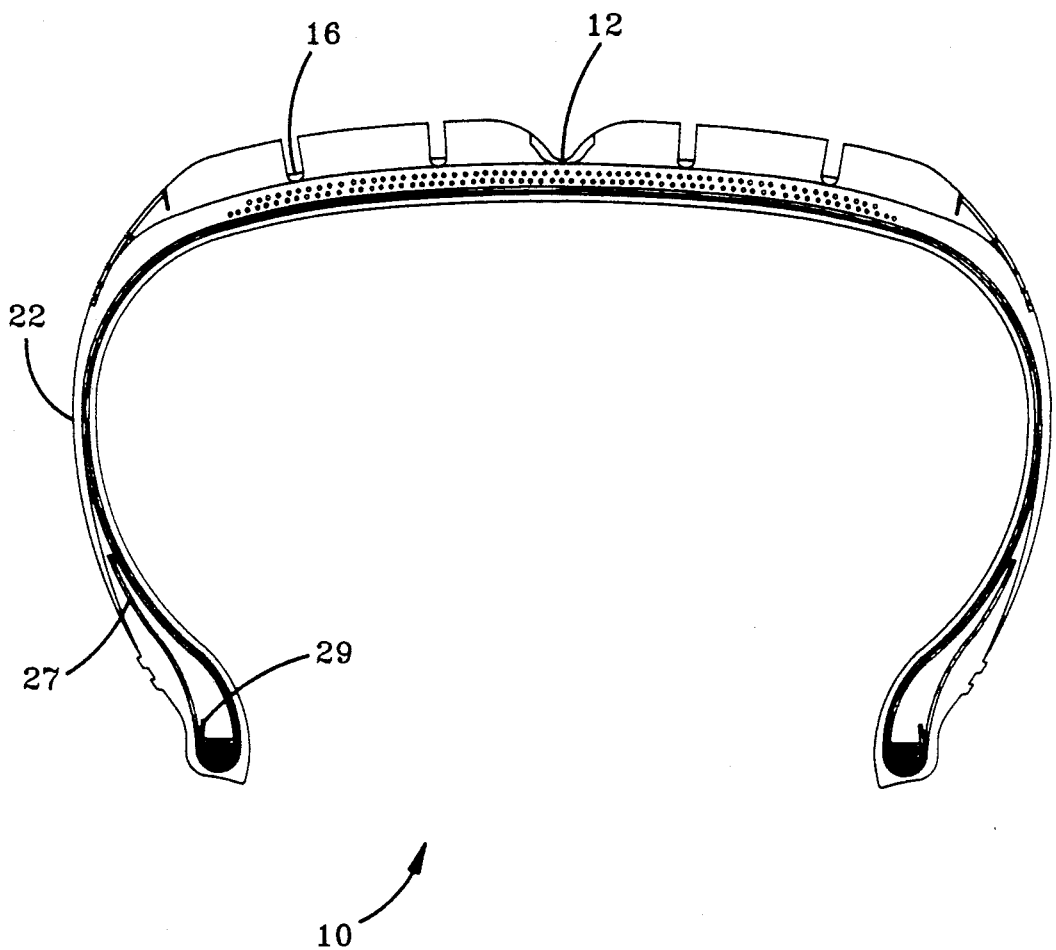
FIG. 3 illustrates a cross section of the tire.

It should be noted that the lugs 18a adjacent to aqua channel 12 are contoured into the aqua channel, forming a part of the aqua channel such that the aqua channel has a curved U shape (having a rounded bottom and curved sides) substantially as shown in FIG. 3, and that the lateral grooves 14 initiate well into the aqua channel.

The tire of the invention may be made to utilize a $\beta$ pitch sequence, an RPAH sequence or any other pitching that is found to be acceptable for a given road surface or purpose.

Pitching as it relates to tires, is well characterized by the prior art as illustrated by U.S. Pat. No. 4,474,223 to Landers and references cited therein.

In the embodiment of tire 10b, tread portions 11c and 11d are skewed. By skewed it is meant there is a pitch boundary shift between tread portion 11c and tread portion 11d.

In tire 10b, lateral groove 14 is intersected by circumferential grooves 16a which are discontinuous, interrupted by bridges 19. For brevity of description, the term grooves embraces both the discontinuous grooves of tire 10b and the continuous grooves of tire 10a.

In the embodiment of tire 10b, lugs or lug segments 18b between pairs of lateral grooves 14a may be characterized as a single element or block since lug segments 18b are connected to each other by bridges 19. In certain locations, the tread depth of the slots is about 0.53 cm (0.21 in) inch and are not as deep as the grooves (about 0.79 cm (0.31 in). The rubber between the bottom of the slot, in these locations, and the tread base are known as tie bars 38. Thus bridge 19 connects the leading portion 37 of one lug with the trailing portion 39 of an adjacent lug, and tie bars 38 provide a connection between the parts of the lugs, and together they provide one block element from the shoulder to the center of the tire.

In the prior art, it has been shown that long lateral lugs are particularly prone to irregular wear, presumably because of the distortion of the lug and the resulting squirm when part of a lug is in a footprint and part of the lug is outside the footprint. In the lug configuration of tire 10b, although bridges 19 tie the lugs 18 together into one continuous block, providing lateral stability to the tire, the small amount of rubber employed in bridges 19, and slots 17, allow the lugs limited independent movement, reducing the amount of squirm and consequent irregular wear. The lateral stability attributed to the bridges provides good handling and cornering properties.

Bridges 19 also maintain the width of grooves 16a in the footprint, assuring the widest possible flow path for the longitudinal grooves. Tie bars 38 cause each set of lugs between a pair of lateral grooves to act together, stiffening the tread and reducing relative strain of individual lugs.

With reference now to FIG. 3, the carcass of the tire may comprise at least one high turn up ply 27 and at least one low turn up ply 29 to improve the stiffness of tire sidewall 22.

With reference again to FIG. 3, a cross section of the tire illustrates that the depth of aqua channel 12 may be less than 100% of the tread depth. In general it is believed that the aqua channel functions as desired when its depth is 78% to 100% of the total tread depth. Since the lateral grooves 14 initiate in the aqua channel, and lugs 18a are contoured into the aqua channel, as global treadwear occurs and the depth and width of the aqua channel is reduced, additional rubber from the contoured lugs begins to make contact with the road, and additional lengths of lateral grooves make contact with the road, partially offsetting lost properties attributable to treadwear. As a result, it is believed that the beneficial properties of the tire of the invention are retained substantially over the life of the tire.

The contour of the tread, as best illustrated in FIG. 3 is an approximation to a portion of a logarithmic spiral from the equatorial plane of the tire to its shoulder. The ratio of the radius at the shoulder to the radius at the centerline is 0.28 to 0.48, preferably about 0.38. It is believed that this contour of the tread causes a more even distribution of weight in the footprint of the tire which theoretically improves traction and wear properties.

Figure 4:
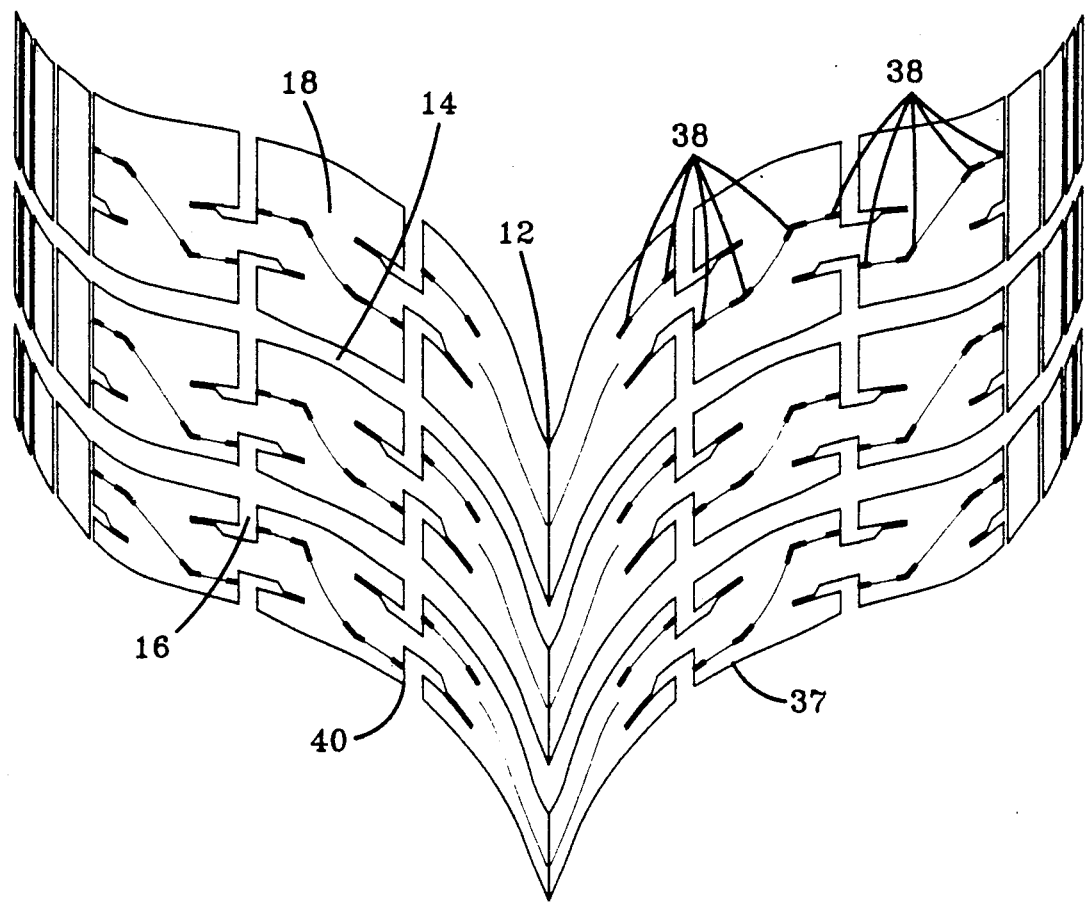
FIG. 4 illustrates a portion of the tread pattern of the tire showing the curved pitch.

With reference now to FIG. 4, it can be seen that the curved lateral groove 14 causes a natural shift between each lug 18 along a lateral groove, extending each lateral block element through a substantial circumferential part of the tire, which means that lugs defined by each curved lateral groove are associated with a large number of different radial reinforcement cords in a radial tire.

Accordingly, although each lug has an average length, each lateral lug block is associated with 1½ to 2½ times as many carcass reinforcement cords as when laterally aligned in the illustrated embodiment, since the lateral lugs are tied together by tie bars 38 and bridges 19, good lateral stability is obtained, even though the tire tread has a significant void area in the middle of the tread.

A preferred tread compound used in the tire is an SIBR rubber of the type described in copending U.S. patent application Ser. No. 07/363,811, filed Jun. 9, 1989 and Ser. No. 07/213,019 filed Jun. 29, 1988 now U.S. Pat. No. 5,047,483, issued Sep. 10, 1991, incorporated herein by reference.

Figure 5:
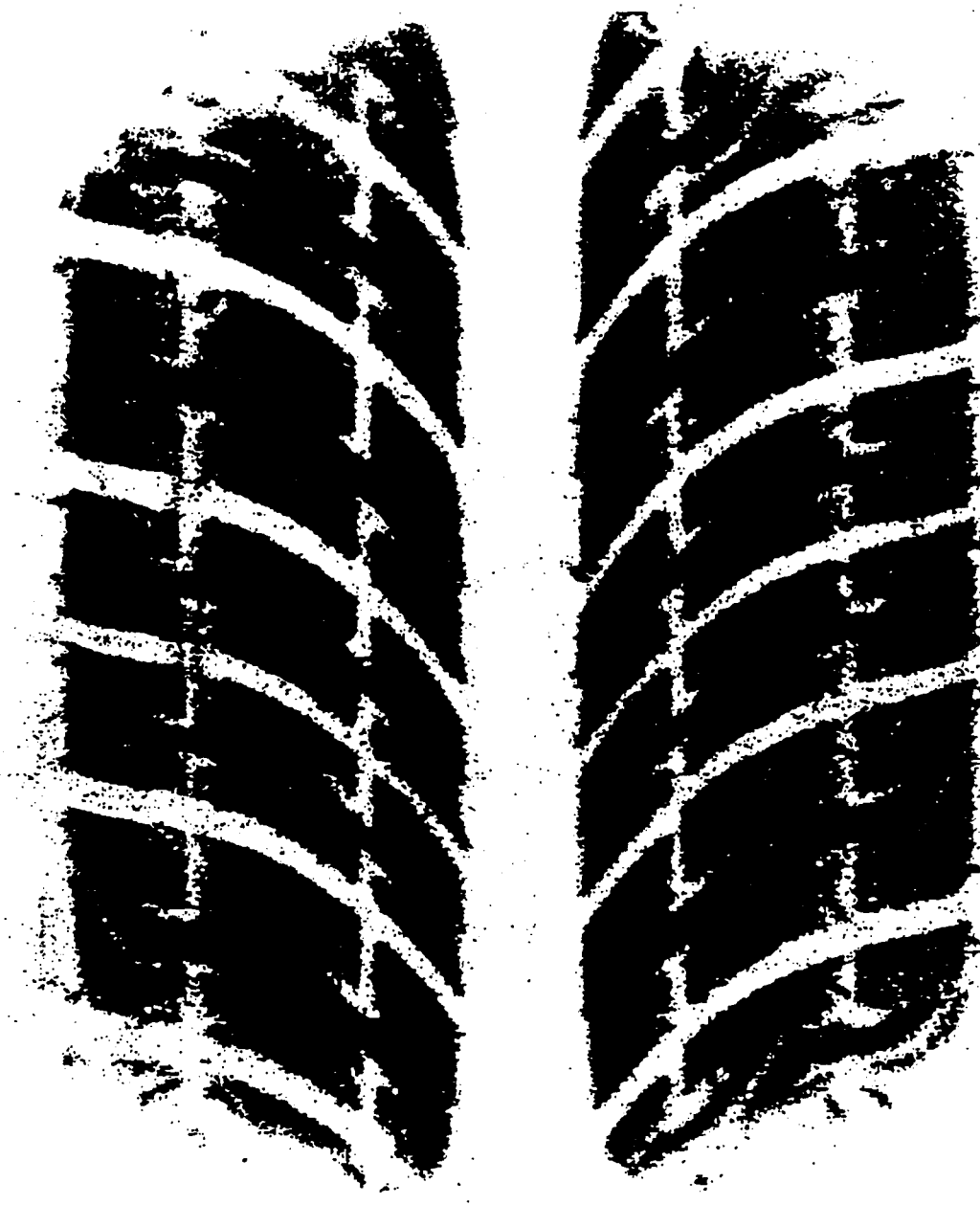
FIG. 5 illustrates a footprint produced by the tire illustrated in FIG. 2.

With reference now to FIG. 5, a footprint of the tire illustrated in FIG. 2 shows an overall oval shape which is typical of most well made passenger tires. The footprint comprises two base to base trapezoidally shaped contact patches. There is no collapse in the leading and trailing parts of the footprint as is typical of many prior art tires having a wide center groove. It is believed that the footprint obtained is a result of the combination of various structural features provided in the tire as described herein such as the curved lateral grooves, which distributes lateral force in the tire over a large number of reinforcing cords, the tie bars which permit independent movement of parts of the lug but cause stresses to be shared by the whole lug, and in the case where bridges are used to tie lugs together laterally, the fact that all the lateral lugs along a groove share the stresses encountered by the tire. Those skilled in the art will recognize that trapezoidal shaped footprint patches with more acute angles that approach the shape of a rectangle may also be desirable and the invention is not limited by the specific embodiment shown.

Since the carcass and belt of the tire are conventional and are the same as those used in Eagle ® GT+4 Tires and comprise 2 polyester carcass plies and 2 steel belts it is believed that the stability of the footprint, despite the wide aqua-channel, is due in part to lateral stability provided by the curved grooves in the tread. The shape of the tread lugs causes each lug to interact with a large number of radial carcass cords (contact force is spread over a large area) and in the tread design where bridges 19 are used, bridges 19 further enhance the lateral stability.

Surprisingly, it has bee found that when the tires of the invention are mounted backwards (i.e. with the tread design directionally opposite to the direction which provides optimum wet traction), superior performance in snow is achieved. It is believed that superior traction in snow is obtained for the same reasons that superior wet braking is achieved, i.e. the low trailing groove wall angle and the curved tread design give the tire superior biting properties.

The invention is further illustrated with reference to the following examples.

EXAMPLE 1

This example compares wet and dry slide properties of a tire of the invention (A) and a similar tire made without an aqua channel (B) to a commercially available rain tire (Uniroyal Tigerpaw TM) as a control. The results are normalized to control equal 100.

| | Results | | | | | | | |
|---|---|---|---|---|---|---|---|---|
| | Wet 20 | | Wet 40 | | Wet 60 | | Dry 40 | |
| Const | Peak | Slide | Peak | Slide | Peak | Slide | Peak | Slide |
| Control | 100 | 100 | 100 | 100 | 100 | 100 | 100 | 100 |
| A | 124− | 123+ | 132− | 111+ | 125+ | 101= | 106+ | 111+ |

-continued

| | Results | | | | | | | |
|---|---|---|---|---|---|---|---|---|
| | Wet 20 | | Wet 40 | | Wet 60 | | Dry 40 | |
| Const | Peak | Slide | Peak | Slide | Peak | Slide | Peak | Slide |
| B | 113− | 112− | 123+ | 97− | 119− | 78− | 105+ | 107− |

Note:
+ means better than the control within a 95% confidence level
= means equal to the control within a 95% confidence level
− means worse than the control within a 95% confidence level All tests were made on an asphalt surface. The results under the heading Wet 20 indicates the normalized length of the slide when full braking was initiated at 44 KPb (20 mph) on a wet asphalt surface. The headings of the other tests are similarly descriptive.

For wet traction, the aquachannel appears to have a significant effect. The average peak and slide ratings were 11 to 12% higher with the aquachannel than without. The aquachannel appears to have little effect on dry traction.

The aquachannel used in this test was the narrower, shallower design illustrated in FIG. 1. The lateral and annular grooves had the configuration illustrated in FIG. 2.

EXAMPLE 2

This example illustrates a snow handling test. This test measures the "g"s encountered during acceleration, deceleration (on braking), and cornering. Measurements were made using instruments or were calculated from the data obtained. The control is an Invicta GS tire, #2 is a tire of the invention made using an SIBR rubber tread compound, #3 is a tire of the invention made using the same tread rubber as the control which was mounted backwards, #4 is the same tire as #3 mounted in the intended direction, and #5 is a Michelin XA4 tire. All tires were size P205/70R14.

| | Control | #2 | #3 | #4 | #5 |
|---|---|---|---|---|---|
| Acceleration | .17 | .17 | .17 | .15 | .15 |
| Deceleration | .42 | .42 | .39 | .40 | .39 |
| Cornering | .28 | .28 | .28 | .26 | .28 |

A difference of 0.02 is the detectable limit of the test. Higher numbers show better results. The data indicates that, for these parameters, the tire of the invention is at least equivalent to all season tires now in use.

The same tires were evaluated subjectively in a packed snow handling test with the following results.

| SUBJECTIVE PACKED SNOW HANDLING | | | | | |
|---|---|---|---|---|---|
| AMBIENT TEMP: 0-6     DATE: 1-30-91 | | | | | |
| SURFACE TEMP: 5-9     DRIVER: Neale | | | | | |
| | Control | #2 | #3 | #4 | #5 |
| ACCEL: TRACTION | 5 | 5 | 5 | 4.5 | 4.5 |
| ACCEL: YAW STABILITY | 5 | 5 | 4.5 | 5 | 4 |
| ACCEL: 0-50 m TIME-SECONDS | 7.95 7.94 | 7.92 | 8.06 | 8.41 | 8.34 |
| STANDARD DEV. BRAKE: TRACTION | 5 | 5 | 4.5 | 4.5 | 4.5 |
| LAT. TRACTION FRONT | 5 | 5 | 5 | 4 | 5 |
| LAT. TRACTION | 5 | 5 | 5.5 | 4 | 5.5 |

-continued

| SUBJECTIVE PACKED SNOW HANDLING | | | | | |
|---|---|---|---|---|---|
| AMBIENT TEMP: 0-6     DATE: 1-30-91 | | | | | |
| SURFACE TEMP: 5-9     DRIVER: Neale | | | | | |
| | Control | #2 | #3 | #4 | #5 |
| REAR | | | | | |

Control Good straight line, slow front response - then rear slide
Set 2 Similar to Control
Set 3 Initial turn-in good, little rear slide, good balance.
Set 4 Followed ruts, slow to turn-in, then rear slide, less grip.
Set 5 Mich . . . Good lat grip, good overall balance, good turn in.

In the subjective packed snow handling, the driver rated the performance of each tire subjectively. Higher numbers in the subjective ratings indicate better results.

EXAMPLE 3

In a different size (as compared to Example 2), the "g" measurements and subjective snow handling tests were repeated comparing an Arriva tire as a control (size P185/70R13), (#2) Corsa GT as a second control, (#3) the tire of the invention, and (#4) a Michelin X4A. As in example 2, "g"s were measured, and the driver provided his subjective conclusions.

| | Control | #2 | #3 | #4 |
|---|---|---|---|---|
| Acceleration | .17 | .15 | .14 | .13 |
| Deceleration | .42 | .39 | .40 | .39 |
| Cornering | .29 | .30 | .25 | .27 |

General Test Details
1. Wheels 5 × 13
2. 29 psi inflation
3. Vehicle: Corolla

The acceleration, deceleration and cornering data, as measured by the instruments, seems to indicate that, except that Arriva was measurably better than the Michelin XA4, the four tires had comparable properties.

The subjective rating given by the driver is tabulated below, along with the driver's comments.

| SUBJECTIVE PACKED SNOW HANDLING - T74 | | | | |
|---|---|---|---|---|
| AMBIENT TEMP: 18-20     DATE: 1-27-91 | | | | |
| SURFACE TEMP: 16-18     Driver: Neale | | | | |
| | Control | #2 | #3 | #4 |
| ACCEL: Traction | 5 | 4.5 | 4 | 4 |
| ACCEL: YAW STABILITY | 5 | 4 | 4.5 | 4 |
| ACCEL: 0-50 m TIME-SECONDS | 7.78 7.78 | 8.47 | 8.78 | 8.83 |
| BRAKE: TRACTION | 5 | 5 | 5 | 5 |
| LAT. TRACTION: FRONT | 5 | 4.5 | 4 | 4.5 |
| LAT. TRACTION | 5 | 4.5 | 4 | 4.5 |

-continued

SUBJECTIVE PACKED SNOW HANDLING - T74
AMBIENT TEMP: 18-20   DATE: 1-27-91
SURFACE TEMP 16-18    Driver: Neale

|  | Control | #2 | #3 | #4 |
|---|---|---|---|---|
| REAR | | | | |

Control Good balance. slt o.s.
Set #2 Push, then rear slide, followed ruts
Set #3 Less lat grip, straight line down slightly but didn't follow ruts as badly as Set #2
Set #4 Like Control but less grip, poor on following ruts In the subjective ratings, the higher numbers indicate the best results.

The Arriva had a good balance between straight line and lateral grip. The Corsa GT, while generating good lateral readings on the G-Analyst, understeered for the first third of the turn, then proceeded to oversteer around the rest of the turn. The tire of the invention just lacked lateral grip and usually finished the turn in a four wheel slide. The Michelin also had a good balance of traction, just at a lower limit than the Arriva.

EXAMPLE 4

Tires of the invention, along with a set of Invicta GS controls and Michelin XA4 tires, were tested for wet handling.

In the test, an Invicta GS was used as a control, a tire of the invention made without bridges between lugs was set #2, a tire of the invention made using bridges laterally between lugs was set #3, and a Michelin XA4 was set #4.

| WET HANDLING - FRONT WHEEL & 4 WHEEL DRIVE DRIVER: STOLL | | | | |
|---|---|---|---|---|
|  | CONTROL | #2 | #3 | #4 |
| AVG LAP TIME | 57.93 | 56.64 | 56.37 | 58.62 |
| S.D. | .19 | .08 | .03 | .14 |
| Circle Lat Gs | .669 | .690 | .700 | .642 |
| S.D. | .003 | .004 | .003 | .001 |
| STRAIGHT LINE HYDROPLANING | 5 | 5.5 | 5.5 | 4.5 |
| LATERAL HYDROPLANING | 5 | 5.5 | 5.5 | 4.5 |
| STEERING RESPONSE | 5 | 5.5 | 6 | 4.5 |
| OVERSTEER | 5 | 5 | 5.5 | 4.5 |
| OFF THROTTLE OVERSTEER | 5 | 5 | 5.5 | 4.5 |
| TRACTION TRANSITION | 5 | 5 | 5.5 | 4 |
| LATERAL GRIP | 5 | 6 | 5.5 | 4.5 |
| BRAKING TRACTION | 5 | 7 | 6.5 | 5.5 |
| ACCELERATION TRACTION | 5 | 6 | 5.5 | 4.5 |

General Test Details
1. Wheels 5.5 × 14JJ stamped steel.
2. Inflation: 35 psi, F&R.
3. Load: Driver.
4. Vehicle Characteristics: Stock, aligned to OE specs.

COMMENTS

Set 1. (Control) Lots of off-throttle oversteer. Car gets real squirrely in transients. Poor F/R balance in braking—lots of rear bias. Also, lots of understeer while powering out of corners.

Set 2. Braking grip is phenomenal compared to last set . . . quantum-leap improvement. Tires have more stopping power than car has brakes. Also, very good grip in cornering + acceleration. Tires feel like they have much better road contact.

Set 3. Most precise steering of all sets. Very good braking. Excellent controllability in transients, minimal O/S, good acc. grip in powering out of corners, good cornering grip.

Set 4. Tires are just slippery all over. Not predictable or smooth. Car pushes a lot under power, but rear gets real loose in transients off-throttle. Not great braking . . . only marginally better than controls.

CONCLUSIONS

Sets 2 & 3 were best overall. Set 2 had braking, cornering, and acceleration grip that was far superior to the controls; it was also better than any of the sets as well. Set 3 had wet grip that was nearly equal to that of set 2, and was actually superior to set 2 for oversteer parameters. Set 3 also had a steering feel that was more precise and responsive than any other set. Further, set 3 was the fastest set tested, on both the 200' circle as well as the handling course itself. It was a very easy set to drive fast in the wet.

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic automobile tire for use on paved surfaces having an aspect ration of 0.35 to 0.8 and having a footprint comprising two distinct contact patches, each said contact patch having a substantially trapezoidal shape wherein the two contact patches are oriented longer base-to-longer base and wherein the net-to-gross in the overall footprint is 55% to 65% and the net-to-gross in the contact patch is 65% to 75%, wherein said contact patches are separated by a void area that comprises about 10% to about 20% of footprint width, and wherein each contact patch demonstrates lateral grooves substantially longer than the width of said contact patch.

2. The tire of claim 1 wherein the net-to-gross in the overall footprint is about 60% and the net-to-gross in each contact patch is about 70%.

3. The tire of claim 1 in which said void area comprises about 15% of said footprint width.

4. The tire of claim 1 in which each contact patch demonstrates longitudinal void areas that are interrupted by narrow bridges.

5. The tire of claim 1 in which said lateral grooves are arcuate and are displaced substantially the width of a block from one end of the groove to the other end of the groove.

6. The tire of claim 1 in which said lateral grooves are skewed.

* * * * *

REEXAMINATION CERTIFICATE (2859th)
United States Patent [19]
Landers et al.

[11] B1 5,176,766
[45] Certificate Issued Apr. 30, 1996

[54] PNEUMATIC TIRE HAVING A UNIQUE FOOTPRINT

[75] Inventors: Samuel P. Landers, Uniontown; William E. Glover, Akron; John S. Attinello, Hartville, all of Ohio

[73] Assignee: The Goodyear Tire & Rubber Company, Akron, Ohio

Reexamination Request:
No. 90/003,724, Feb. 15, 1995

Reexamination Certificate for:
Patent No.: 5,176,766
Issued: Jan. 5, 1993
Appl. No.: 666,329
Filed: Mar. 8, 1991

[51] Int. Cl.$^6$ ............................................. B60C 11/11
[52] U.S. Cl. ........................................ 152/209 R; D12/147
[58] Field of Search ..................... 152/209 R, 209 D; D12/146–151

[56] References Cited

U.S. PATENT DOCUMENTS

| | | |
|---|---|---|
| D. 43,495 | 2/1913 | Christy . |
| D. 92,050 | 4/1934 | Vidale . |
| D. 283,500 | 4/1986 | Graas et al. . |
| D. 283,809 | 5/1986 | Kuramochi et al. . |
| D. 291,874 | 9/1987 | Hayakawa et al. . |
| D. 311,893 | 11/1990 | Covert et al. . |
| D. 312,993 | 12/1990 | Guermandi et al. . |
| D. 328,444 | 8/1992 | Graas . |
| D. 328,729 | 8/1992 | Maxwell et al. . |
| D. 329,032 | 9/1992 | Maxwell et al. . |
| D. 335,115 | 4/1993 | Suzuki . |
| D. 336,273 | 6/1993 | Kohara et al. . |
| 942,025 | 11/1909 | Winter . |

(List continued on next page.)

FOREIGN PATENT DOCUMENTS

| | | |
|---|---|---|
| 638842 | 3/1962 | Canada . |
| 0296605 | 6/1988 | European Pat. Off. . |
| 0317487 | 5/1989 | European Pat. Off. . |
| 0391300 | 10/1990 | European Pat. Off. . |
| 0503404A1 | 2/1992 | European Pat. Off. . |
| 819836 | 10/1937 | France . |
| 1505035 | 3/1969 | Germany . |
| 1505105 | 7/1969 | Germany . |
| 7501761 | 6/1975 | Germany . |
| 3723368 | 7/1987 | Germany . |
| 3624408 | 2/1988 | Germany . |
| 3726593 | 9/1988 | Germany . |
| 3901624 | 8/1989 | Germany . |
| 4032072 | 4/1992 | Germany . |
| 0100503 | 9/1978 | Japan . |
| 0022601 | 1/1989 | Japan . |
| 2001265 | 3/1989 | Japan . |
| 900285 | 3/1995 | Sweden . |
| 126520 | 6/1928 | Switzerland . |
| 736068 | 11/1953 | United Kingdom . |
| 1310498 | 3/1973 | United Kingdom . |
| 2193933 | 2/1988 | United Kingdom . |
| 2231538 | 11/1990 | United Kingdom . |
| WO9014239 | 11/1990 | WIPO . |

OTHER PUBLICATIONS

"Tire Hydroplaning: Testing, Analysis, and Design"; by Robert W. Yeager published in *The Physics of Tire Traction, Theory and Experiment*, by D. F. Hayes and A. L. Browne, pp. 25–64 (1974).

*Testing and Analysis of Tire Hydroplaning*, by R. W. Yeager and J. L. Tuttle, Society of Automotive Engineers, May 22–26, 1972.

(List continued on next page.)

*Primary Examiner*—Jeff H. Aftergut

[57] ABSTRACT

A directional pneumatic tire having improved wet traction is provided. The tire has an annular aqua channel and curved lateral grooves to direct water from the footprint to the shoulder area of the tire to help prevent hydroplaning. It has been found that the tire has a unique footprint which appears to characterize its stability. The footprint comprises two substantially trapezoidal contact patches which are oriented base to base and are separated from each other by 10% to 22% of the total tread width.

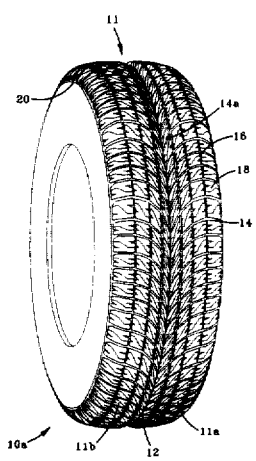

U.S. PATENT DOCUMENTS

| | | |
|---|---|---|
| 1,127,517 | 2/1915 | Richardson . |
| 3,254,693 | 6/1966 | Travers . |
| 3,384,144 | 5/1968 | Tiborcz . |
| 3,410,329 | 11/1968 | Bezbatchenko . |
| 3,457,981 | 7/1969 | Verdier . |
| 3,707,177 | 12/1972 | Boileau . |
| 3,830,273 | 8/1974 | Boileau . |
| 3,939,890 | 2/1976 | Abe . |
| 4,057,089 | 11/1977 | Johannsen . |
| 4,078,596 | 3/1978 | Nakayama et al. . |
| 4,456,046 | 6/1984 | Miller . |
| 4,470,443 | 9/1984 | Eraud . |
| 4,474,223 | 10/1984 | Landers . |
| 4,667,717 | 5/1987 | Graas . |
| 4,687,037 | 8/1987 | Pfeiffer et al. . |
| 4,700,762 | 10/1987 | Landers . |
| 4,722,378 | 2/1988 | Carolla et al. . |
| 4,726,407 | 2/1988 | Hayakawa et al. . |
| 4,730,654 | 3/1988 | Yamashita et al. . |
| 4,765,384 | 8/1988 | Rohde . |
| 4,832,099 | 5/1989 | Matsumoto . |
| 4,913,208 | 4/1990 | Anderson et al. . |
| 5,000,239 | 3/1991 | Brayer et al. . |
| 5,047,483 | 9/1991 | Halasa et al. . |
| 5,299,612 | 4/1994 | Saito et al. . |

OTHER PUBLICATIONS

*Technical Note D-1376 Influence of Tire Tread Pattern and Runway Surface Condition on Braking Friction and Rolling Resistance of a Modern Aircraft Tire*, by W. B. Horne and T. J. W. LeLand, National Aeronautics and Space Administration, Sep. 1962, pp. 30–34 and 40–55.

*Linköping Studies in Science and Technology*, Dissertations No. 166, pp. 68, 75–76, published 1987, Linköping University, Sweden.

*Suspension Technology*, by Jörnsen Reimpell, Fahrwerktechnik, 1970, pp. 27–32.

*Mechanics of Pneumatic Tires*, S. K. Clark, U.S. Department of Transportation, Washington, D.C., 1981, pp. 249–275 and 278.

*VDI Berichte 778* [VDI Report 788], by Verein Deutscher Ingenieure (Union of German Engineers), published Sep. 1989, Hannover, Germany, pp. 179, 189 (with English translation of cover page and p. 189).

Goodyear News Release #19262–390.

General Tire, Saturday Evening Post Ad, "General Dual 90", Mar. 23, 1957.

"Tire Materials & Construction", Automotive Engineering, Oct. 1992, pp. 23–28.

Abstract of JP 63–260306, Apr. 10, 1990.

Hannoversche Allgemeine Zeitung Car Brochure, p. 38, no date.

Continental Product Brochure, Sep. 1991.

European Rubber Journal, "Designing Tyres for Active Rides", Apr. 1970.

Tyre Design Abstract, DE–624408, Jul. 18, 1986.

Tyre Design Abstract, EP 465,786, Jul. 9, 1990.

Pneumatic Tyre Design, E. C. Woods, Pub. by W Heffer & Sons, Ltd, 1955.

Goodyear Consumer Focus, "Design Treads", Mar., 1991.

Geschmackmusterblatt Heft 14, M8901678, Jul. 25, 1990.

Auto Bild, "Der Reifen, der nicht balin geht", Oct., 1990 (with translation).

Popular Mechanics, "Anti–Aquaplane Tire", Oct., 1991.

Smithers Scientific Services, Inc., "Footprints", Apr. 30, 1985, etc.

General Tire, "Tire Data Book", Dual 90, Rev. Apr. 1965 (assumed to be the date).

Smithers Scientific Services, Inc, Dual 90, Jul., 1967.

Product, item 107, El Dorado URSO, Modern Tire Dealer, May, 1990.

Modern Tire Dealer, Focus on Europe, p. 46, Feb., 1988.

Automotive Engineering, "Tech Briefs", May 1990.

B1 5,176,766

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *